United States Patent
Takeuchi

[11] Patent Number: 5,362,090
[45] Date of Patent: Nov. 8, 1994

[54] SUSPENSION OF MOTOR VEHICLE

[75] Inventor: Naoyuki Takeuchi, Hamamatsu, Japan

[73] Assignee: Suzuki Motor Corporation, Hamamatsu, Japan

[21] Appl. No.: 116,877

[22] Filed: Sep. 7, 1993

[30] Foreign Application Priority Data

Sep. 22, 1992 [JP] Japan ................................. 4-252375
Sep. 22, 1992 [JP] Japan ................................. 4-252376

[51] Int. Cl.$^5$ ............................................. B60G 7/00
[52] U.S. Cl. ................................... 280/660; 280/673; 280/688
[58] Field of Search ...................... 280/96.1, 660, 666, 280/673, 688, 690, 701, 724

[56] References Cited

U.S. PATENT DOCUMENTS

| | | | |
|---|---|---|---|
| 4,761,019 | 8/1988 | Dybensky | 280/96.1 |
| 5,163,603 | 11/1992 | Richart | 280/673 |
| 5,236,209 | 8/1993 | Lopiccolo | 280/96.1 |

*Primary Examiner*—Kenneth R. Rice
*Attorney, Agent, or Firm*—Arnold, White & Durkee

[57] ABSTRACT

An object of the present invention is to provide a suspension of a motor vehicle which can prevent rusting, reduce the manufacturing cost, and easily make the stress occurring inside uniform. To achieve the above object, the suspension is so constructed that an arm body 4 is formed as a whole in an approximate inverse U shape in cross section, and an arm pin portion 6 is fixed by welding to the arm body so that a closed cross section is formed by the arm body 4 and the arm pin portion 6. Further, according to the present invention, the thickness of the arm pin portion 6 is gradually decreased from its center 6b to its base 6c, the center portion 5b of the arm reinforcing member 5 is slightly offset downward, one end 5a of the arm reinforcing member 5 overlaps with the base 6c of the arm pin portion 6, and the arm reinforcing member 5 and the arm pin portion 6 are fixed by welding to the lower part of the arm body 4, by which the change in stiffness of the suspension arm 2 from the arm pin portion 6 to the arm reinforcing member 5 is made smooth.

4 Claims, 9 Drawing Sheets

SUSPENSION OF MOTOR VEHICLE

FIELD OF THE INVENTION AND RELATED ART STATEMENT

The present invention relates to a suspension of a motor vehicle and, more particularly to a suspension of a motor vehicle in which a suspension arm is formed by welding an arm pin portion to an arm body. FIGS. 12 through 14 show a suspension arm 30 for a front suspension of a conventional motor vehicle. In this suspension arm 30, the construction of the arm pin portion 31 side is such that three members of an arm body upper plate 32, an arm body lower plate 33, and an arm pin portion 31 are welded to each other. In FIG. 13, $W_1$ to $W_3$ denote weld portions.

FIGS. 13 and 14 are sectional views taken along the line C—C and D—D of FIG. 12, respectively.

In the conventional suspension arm 30, the arm body upper plate 32 of approximate U shape and the armbody lower plate 33 are joined together in a back-to-back manner via the arm pin portion 31, so that it is difficult to provide a high section modulus.

The arm body upper plate 32 of approximate U shape has a concave portion 34 which is open upward, so that muddy water etc. easily build up in the concave portion 34, which will cause rust.

Since the construction of the arm pin portion 31 side is such as to be formed by three members of an arm body upper plate 32, an arm body lower plate 33, and an arm pin portion 31, the number of parts increases and the weight is high. Further, since the number of welding processes are high as shown by $W_1$, $W_2$, and $W_3$, the assembly property is poor, and the manufacturing cost is high.

Also, there is no continuity between reinforcing members 31 and 35 disposed inside. Therefore, the section modulus changes discontinuously and stepwise, and the stress occurring inside is nonuniform. Thus, the conventional suspension is not satisfactory in terms of improvement in strength.

OBJECT AND SUMMARY OF THE CONVENTION

The present invention was made to solve the above problems. Accordingly, a first object of the present invention is to provide a suspension of a motor vehicle which can prevent rusting and reduce the manufacturing cost.

Further, a second object of the present invention is to provide a suspension of a motor vehicle which can easily make the stress occurring inside uniform.

According to the present invention, to achieve the above first object, a suspension of a motor vehicle, in which a suspension arm is formed by welding an arm pin portion to an arm body, is so constructed that the arm body is formed as a whole in an approximate inverse U shape in cross section, and the arm pin portion is fixed by welding to the arm body, by which a closed cross section is formed by the arm body and the arm pin portion.

Further, to achieve the above second object, a suspension of a motor vehicle, in which a suspension arm is formed by an arm body, an arm reinforcing member, and an arm pin portion, is so constructed that the arm body is formed as a whole in an approximate inverse U shape in cross section, the thickness of the arm pin portion is gradually decreased from its center to its base, the center portion thereof is slightly offset downward, one end of the arm reinforcing member overlaps with the base of the arm pin portion, and the arm reinforcing member and the arm pin portion are fixed by welding to the lower part of the arm body, by which the change in stiffness of the suspension arm from the arm pin portion to the arm reinforcing member is made smooth.

DETAILED DESCRIPTION OF PREFERRED EMBODIMENTS

Figure 1:
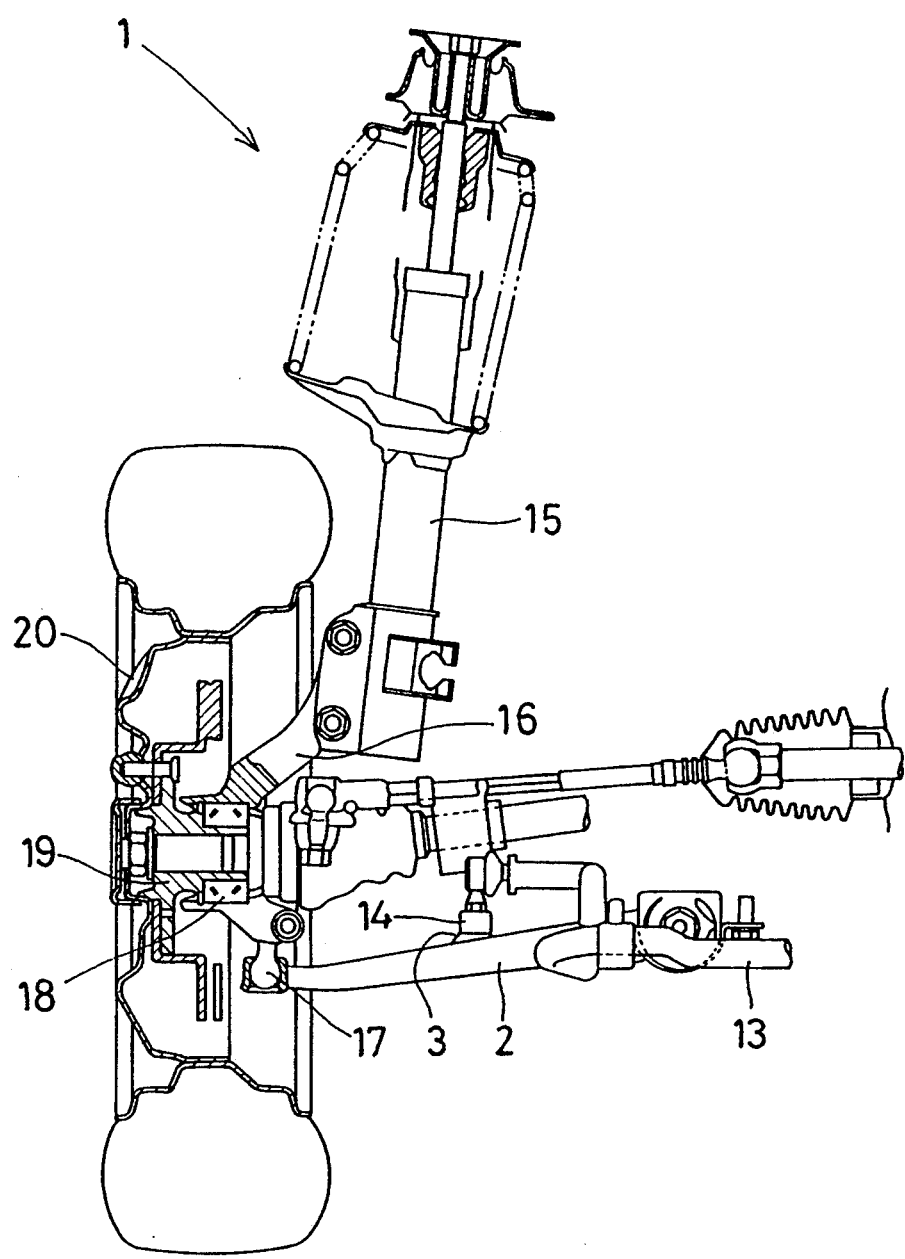
FIG. 1 is a sectional view showing one embodiment of the suspension of a motor vehicle in accordance with the present invention.

One embodiment of the suspension of a motor vehicle in accordance with the present invention will be described in detail with reference to the attached drawings.

FIGS. 1 through 11 show one embodiment of the present invention.

The suspension 1 of a motor vehicle in accordance with one embodiment is a strut type front suspension.

A stabilizer bar bracket 3 is fixed by welding to a suspension arm 2 of the suspension 1.

The suspension arm 2 comprises an arm body 4, an arm reinforcing member 5, an arm pin portion 6, etc. as shown in FIGS. 3 through 9.

The arm body 4 is formed as a whole into an approximate inverse U shape in cross section. One end portion 4a thereof extends to an arm pin portion 6, and the central base portion 4b thereof is provided with an arm boss 7. The other end portion 4c thereof has a ball joint reinforcing member 8.

Figure 8:
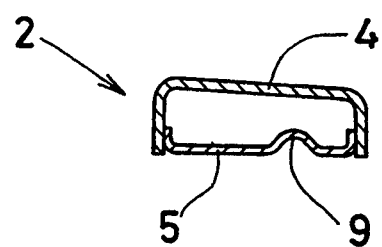
FIG. 8 is a sectional view taken along the line A—A of FIG. 3.

The arm reinforcing member 5 is formed as a whole into an approximate U shape in cross section, and is fixed by welding to the lower part of the arm body 4, as shown in FIG. 8. It forms a closed cross section of an approximately rectangular shape together with the arm body 4. The arm reinforcing member 5 has a groove 9 for reinforcement which has a semi-circular cross section and is convex upward.

With the arm pin portion 6, the end portion 6a constitutes a shaft, and the portion from its center 6b to its base 6c has a thickness gradually decreased by rolling. A groove 1 which is open downward is formed in the arm pin portion 6.

Figure 9:
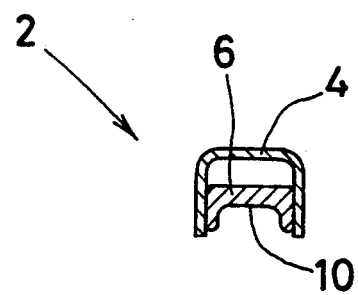
FIG. 9 is a sectional view taken along the line B—B of FIG. 3.
Figure 10:
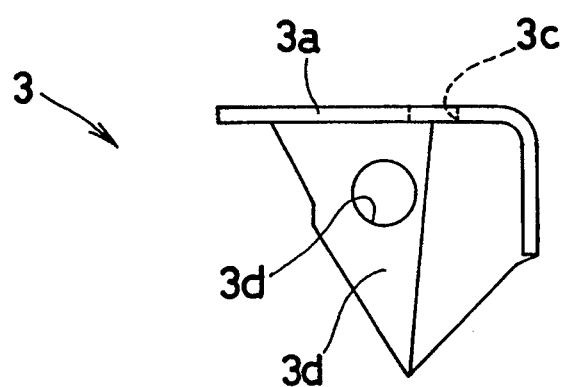
FIG. 10 is a front view of a stabilizer bar bracket for one embodiment of the suspension of a motor vehicle in accordance with the present invention.
Figure 11:
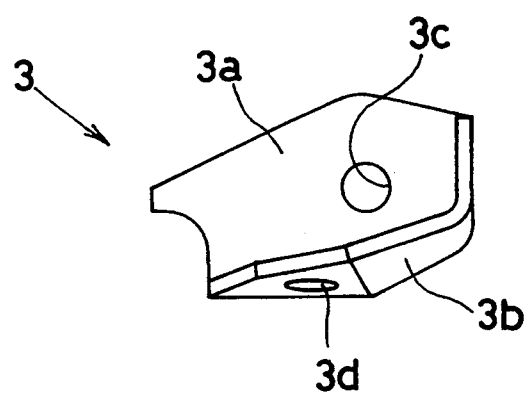
FIG. 11 is a right side view of a stabilizer bar bracket for one embodiment of the suspension of a motor vehicle in accordance with the present invention.
Figure 12:
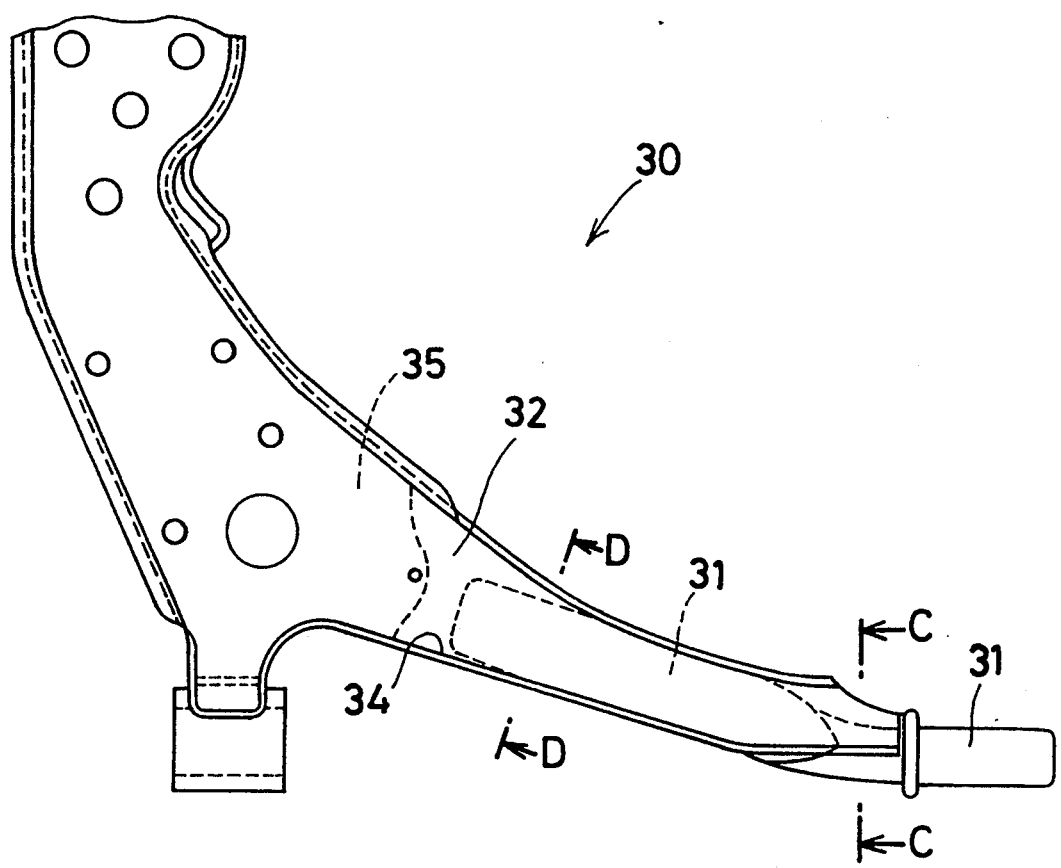
FIG. 12 is a plan view of a suspension arm for a conventional suspension of a motor vehicle.
Figure 13:
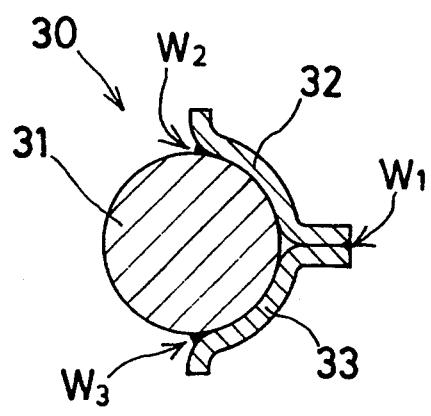
FIG. 13 is a sectional view taken along the line C—C of FIG. 3.
Figure 14:
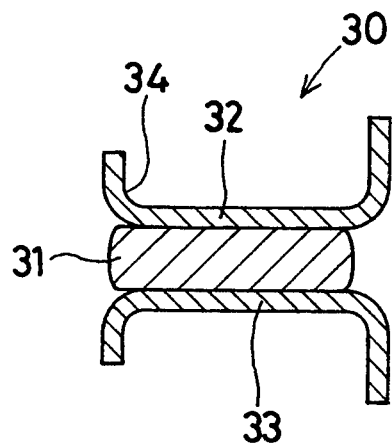
FIG. 14 is a sectional view taken along the line D—D of FIG. 3.

Thus, the cross section of the portion extending from the center 6b to the base 6c of the arm pin portion 6 gradually changes into an inverse U shape to fit the shape of the arm body 4 (see FIG. 9).

Figure 4:
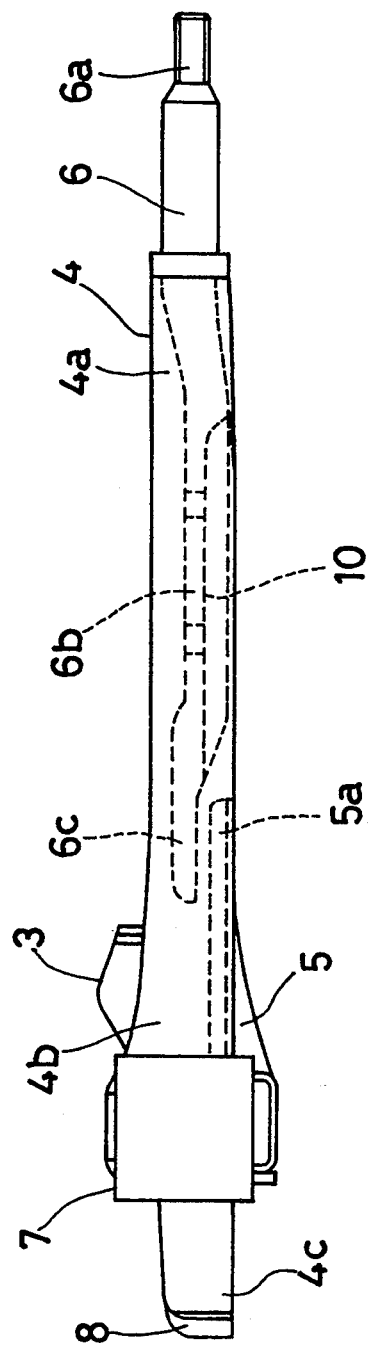
FIG. 4 is a front view of a suspension arm for one embodiment of the suspension of a motor vehicle in accordance with the present invention.

The arm pin portion 6 is bent as shown in FIG. 4 in such a manner that its center portion 6b is positioned slightly lower than its end portion 6a and its base 6c.

The end portion 6a and the base 6c of the arm pin portion 6 formed as described above are positioned at and fixed by welding to the center of the cross section of the arm body 4, and the center 6b is fixed by welding so as to be offset downward from the center of the cross section of the arm body 4.

As described above, in this embodiment, since a closed cross section of an approximately rectangular shape is formed at the portion of the suspension arm 2 on the arm pin portion 6 side, a high section modulus can be provided. In addition, the lower plate used conventionally is unnecessary, so that the portion on the arm pin portion 6 side can be formed by two members.

Also, with the suspension arm 2 of this embodiment, the arm reinforcing member 5 and the arm pin portion 6 can be welded to the arm body 4 from the same direction. Therefore, the welding operation can be performed easily and quickly.

Figure 3:
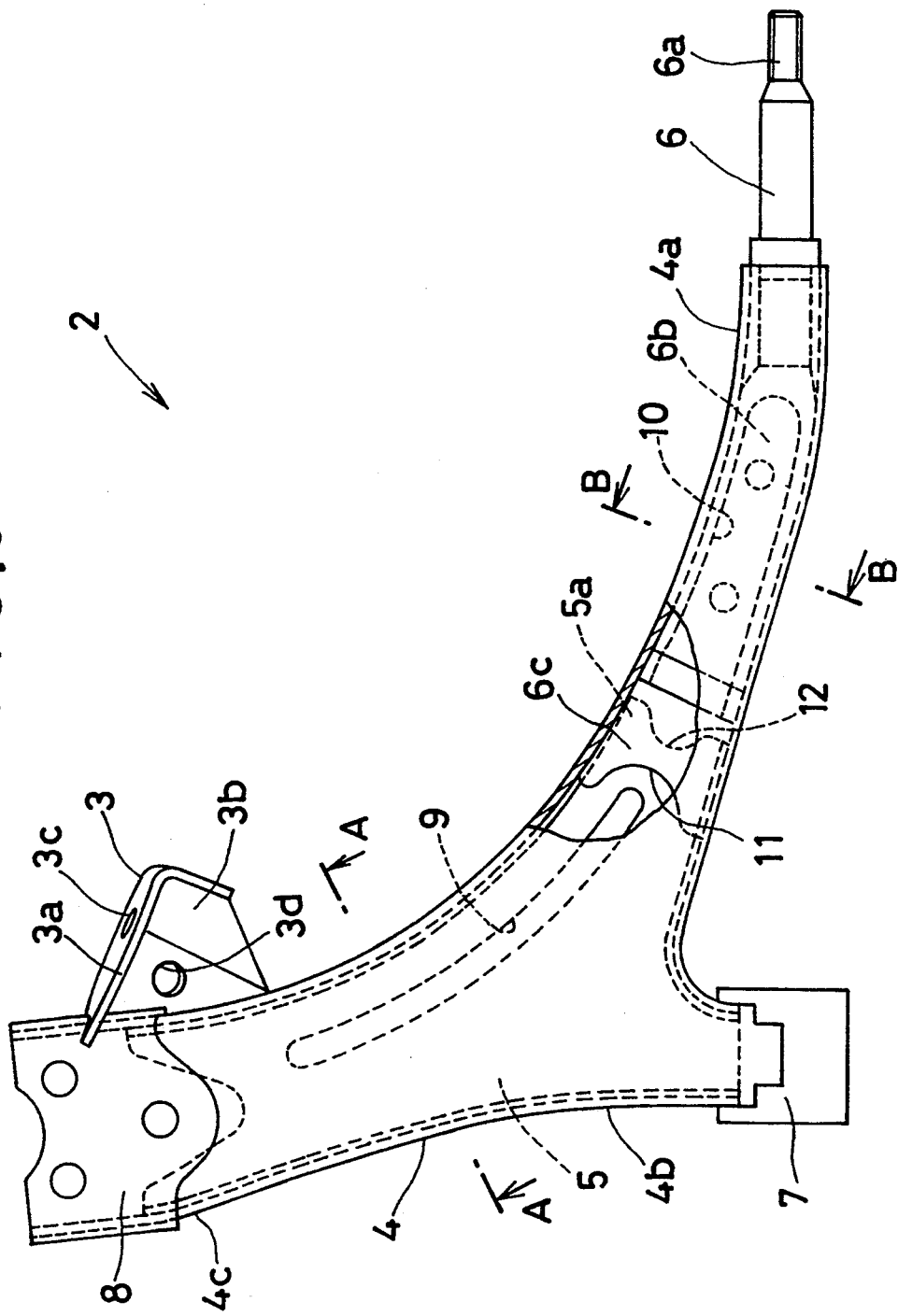
FIG. 3 is a plan view of a suspension arm for one embodiment of the suspension of a motor vehicle in accordance with the present invention.

The base 6c of the arm pin portion 6 overlaps with one end 5a of the arm reinforcing member 5 while being fixed to the arm body 4 as shown in FIGS. 3 and 4. The overlap portions of the base 6c and the end 5a are located with a space interposed vertically.

The base 6c of the arm pin portion 6 and one end 5a of the arm reinforcing member 5 are provided with notches 11 and 12, respectively, to lower the stiffness of these portions. The presence of these notches 11 and 12 smooths the change in stiffness at the overlap portion of the arm pin portion 6 and the arm reinforcing member 5.

Thus, the internal stress of the entire suspension arm 2 can be made uniform, thereby the durability of suspension arm being improved.

Figure 5:
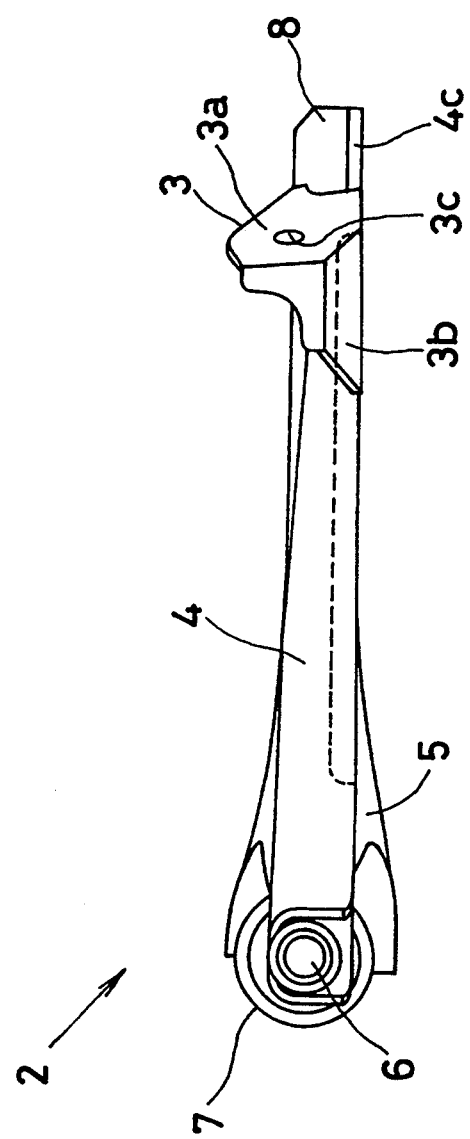
FIG. 5 is a right side view of a suspension arm for one embodiment of the suspension of a motor vehicle in accordance with the present invention.
Figure 6:
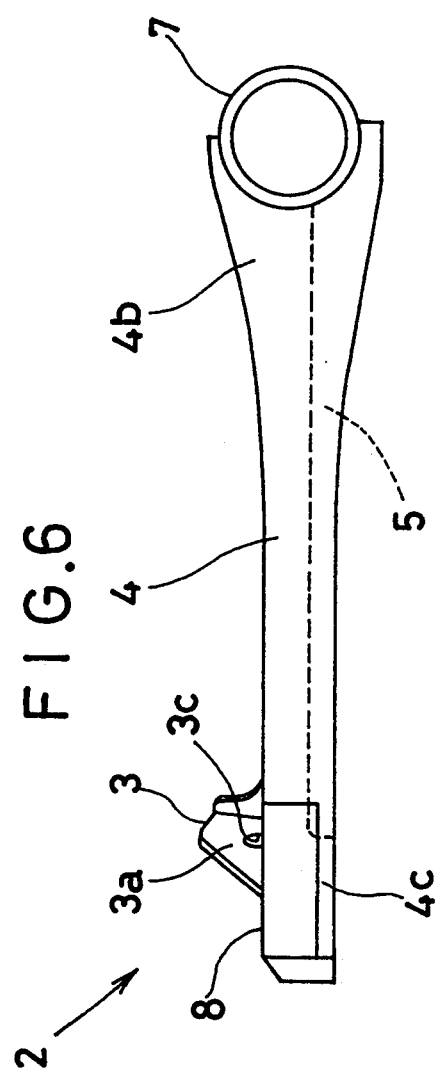
FIG. 6 is a left side view of a suspension arm for one embodiment of the suspension of a motor vehicle in accordance with the present invention.
Figure 7:
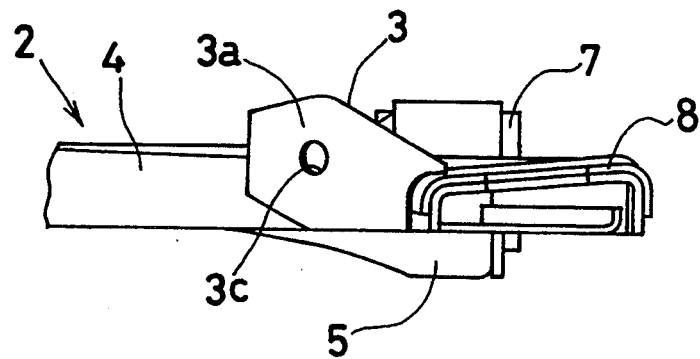
FIG. 7 is a rear elevation of a suspension arm for one embodiment of the suspension of a motor vehicle in accordance with the present invention.

The stabilizer bracket 3 comprises a vertical wall portion 3a having a cross section of an approximate L shape for installing a stabilizer bar joint 4, a bottom wall 3b for enclosing the bottom side of the space in the stabilizer bracket, etc. as shown in FIGS. 5 through 7.

Figure 2:
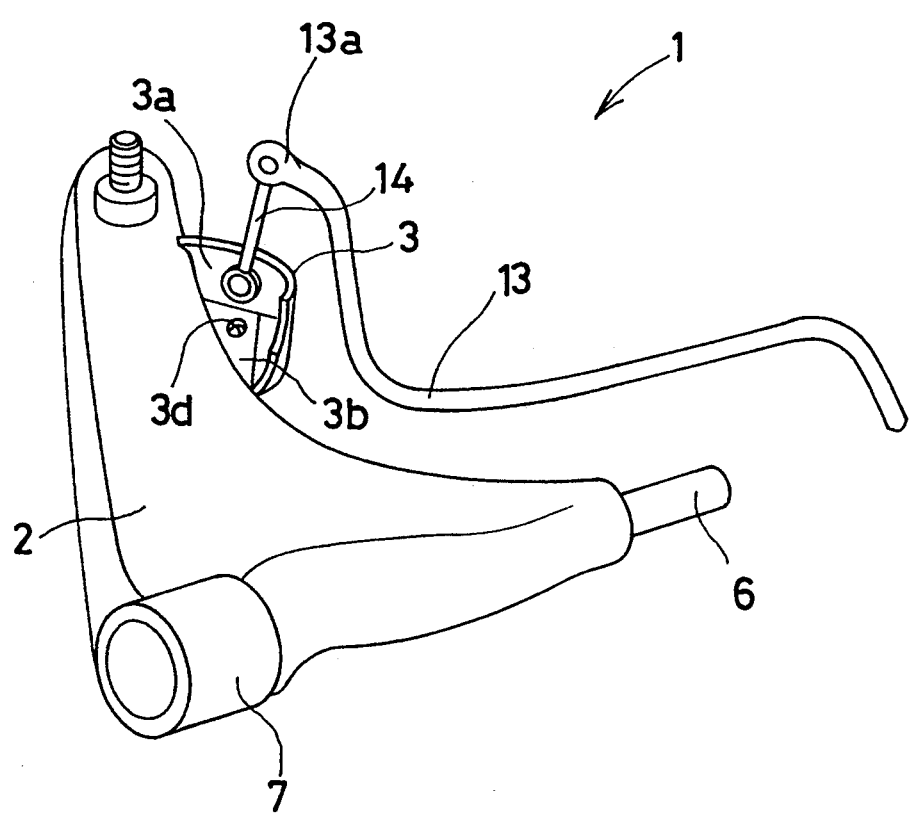
FIG. 2 is a perspective view showing one embodiment of the suspension of a motor vehicle in accordance with the present invention.

This stabilizer bracket 3 is installed near the other end of the suspension arm 2 as shown in FIG. 2.

A hole 3c is formed in the vertical wall 3a of the stabilizer bracket 3, and a drain hole 3d is formed in the bottom wall 3b.

To the vertical wall 3a of the stabilizer bar bracket 3, the end 13a of a stabilize bar 13 is installed via a stabilizer bar joint 14 as shogun in FIG. 2.

In this embodiment, the bottom wall 3b of the stabilizer bar bracket 3 prevents flying stones from entering the stabilizer bracket from the below. Therefore, the damage of stabilizer bar joint 14 due to flying stones can be fully prevented.

In FIG. 1, reference numeral 15 denotes a strut, 16 denotes a steering knuckle, 17 denotes a ball stud, 18 denotes a wheel bearing, 19 denotes a wheel hub, and 20 denotes a wheel.

Although this embodiment has been applied to a front suspension in the above description, the present invention is not limited to this application, and, needless to say, can be applied to a rear suspension.

In the suspension of a motor vehicle in accordance with the present invention, in which the arm pin portion is welded to the arm body to form the suspension arm, the entire arm body is formed in an approximate inverse U shape in cross section and the arm pin portion is fixed by welding to the arm body, by which a closed cross section is formed by the arm body and the arm pin portion. This prevents muddy water etc. from building up in the arm body upper plate, and thus prevents rust from occurring.

The closed cross section formed by the arm body and the arm pin portion provides sufficient section modulus, by which the arm body lower plate can be eliminated. Therefore, the construction of the arm pin portion side of the suspension 30 can be provided by two members of the arm body and the arm pin portion. As a result, the number of parts can be reduced, the assembly property can be improved, and the manufacturing cost can be decreased.

In the suspension of a motor vehicle in accordance with the present invention, the suspension arm is formed by the arm body, the arm reinforcing member, and the arm pin portion, the arm pin portion is formed as a whole in an approximate inverse U shape in cross section, the thickness of the arm pin portion is gradually decreased from it center to its base, the center portion of the arm reinforcing member is slightly offset downward so that one end of the arm reinforcing member overlaps with the base of the arm pin portion, and the arm reinforcing member and the arm pin portion are fixed by welding to the arm body. Therefore, the change in stiffness of the suspension arm from the arm pin portion to the arm reinforcing member is made smooth, and the change in stiffness at the overlap portion is made smooth.

Therefore, the internal stress of the suspension arm can be made uniform, thereby the durability of suspension arm being improved.

I claim:

1. A suspension of a motor vehicle in which a suspension arm is formed by welding an arm pin portion to an arm body, wherein said arm body is formed as a whole in an approximate inverse U shape in cross section, and said arm pin portion is fixed by welding to said arm body, by which a closed cross section is formed by said arm body and said arm pin portion.

2. A suspension of a motor vehicle in which a suspension arm is formed by an arm body, an arm reinforcing member, and an arm pin portion, wherein said arm body is formed as a whole in an approximate inverse U shape in cross section, the thickness of said arm pin portion is gradually decreased from its center to its base, one end of said arm reinforcing member overlaps with the base of said arm pin portion, and said arm reinforcing member and said arm pin portion are fixed by welding to the lower part of said arm body so that a closed cross section is formed between said arm body and said arm reinforcing member and between said arm body and said arm pin portion, by which the change in stiffness of the suspension arm from said arm pin portion to said arm reinforcing member is made smooth.

3. A suspension of a motor vehicle according to claim 2 wherein the center portion of said arm pin portion is slightly offset downward.

4. A suspension of a motor vehicle according to any of claims 1 to 3 wherein a stabilizer bracket is installed at the end of said suspension arm, and a bottom wall is formed on said bracket.

* * * * *